No. 756,368. Patented April 5, 1904.

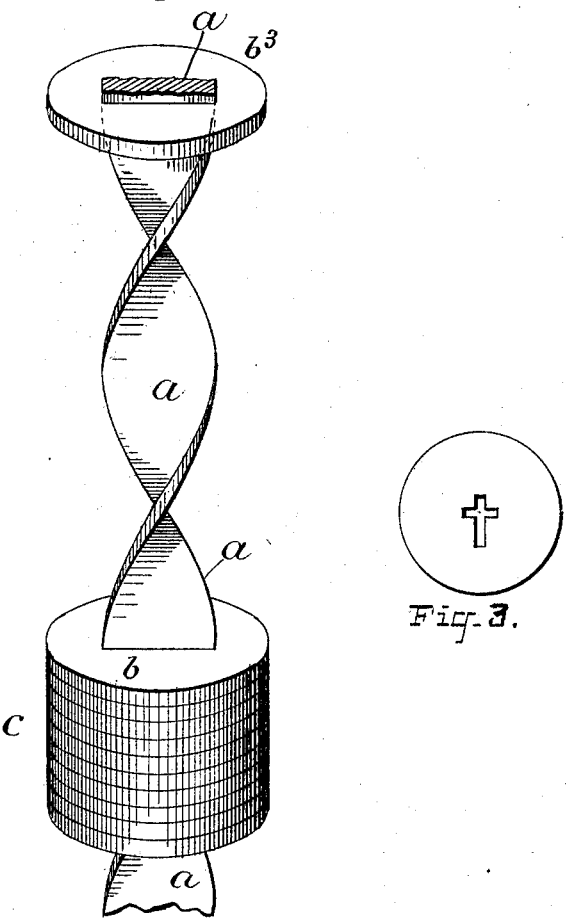

UNITED STATES PATENT OFFICE.

JULIAN A. HURDLE, OF NEW YORK, N. Y.

TUBULAR OR HOLLOW BODY.

SPECIFICATION forming part of Letters Patent No. 756,368, dated April 5, 1904.

Application filed June 15, 1903. Serial No. 161,629. (No model.)

*To all whom it may concern:*

Be it known that I, JULIAN A. HURDLE, a citizen of the United States, residing at the borough of Brooklyn, in the city of New York and State of New York, have invented an Improvement in Tubular or Hollow Bodies, of which the following is a specification.

This invention relates to a new mechanical device having a spiral or other pathed aperture, perforation, orifice, or hole of any configuration extending through or parallel with the axis of a cylindrically-shaped body, or it may be made through or partly through a body of most any shape, and is produced by laminating thin perforated or slotted disks or plates, all of which will be fully described hereinafter.

The invention consists of a body formed of a series of perforated or slotted disks or plates secured together by any means desirable, either by soldering, brazing, riveting, or welding, either electrically or otherwise, the slots aforesaid forming an opening through the entire length of the body.

In the drawings, Figure 1 represents a perspective view in which is shown a series of plates mounted upon a spiral rod or former. Figs. 2 and 3 are face views of the disks, showing different-shaped perforations.

Similar letters refer to similar parts throughout the drawings, in which—

*a* represents a spiral rod or former having mounted thereon the disks *b*, the group *c* of which are in position to be secured together, if desired, while disk $b^3$ is in position to be forced down and against the group *c*. The disk shown in Fig 2. is provided with the perforation *f*, while that of Fig. 3 is provided with the cross-shaped perforation.

It has heretofore been desirable by the machinist or mechanic to produce a spiral-pathed aperture or perforation through a solid cylinder or other-shaped body. They have in many instances resorted to the art of casting; but this mode of production has long since been abandoned, for the reason that they were unable to give it the proper finish on its interior on account of the expense involved and the unequal shrinking and warping of the metal caused by cooling, thereby preventing its adoption for practical purposes. These odjections are obviated by the invention herein disclosed. When desirous of producing a spiral-pathed hole or perforation through or parallel with the axis of a cylindrically-shaped body, the following method and procedure should be carefully observed: The first step to be taken in the matter is to procure a spiral rod. Then mount upon it any desired number of thin perforated or slotted disks or plates. They may be circular, polygonal, square, or oblong. In fact, they can be any shape; but the perforation or slot must coincide in shape and dimensions with the cross-section of the spiral or other shaped rod. It will be obvious that as the plates or disks are mounted upon the spiral or helical shaped rod they may be fastened one with the other by soldering, brazing, welding, riveting, or bolting. In this case the entire lamination is made so compact as to make its entire body practically homogeneous, after which the rod may be pushed through the aperture with ease. If the body formed by the lamination should be held rigidly, the rod will develop a rotary motion in itself; but if the rod is held rigidly and the laminated body made to move to and fro it will develop a rotary movement in itself. It will be obvious that a mechanical device of this character can be used to great advantage when applied to various appliances and devices developed by the artisans of the present century.

Having thus described my invention, what I claim as new, and desire to secure by Letters Patent, is—

1. As a new article of manufacture for mechanical devices, a body formed of a series of perforated disks or plates, some of which have the perforations thereof arranged slightly out of register with each other, and secured together so as to form a body having an opening of any desired irregular shape through its entire length.

2. As a new article of manufacture for mechanical devices, a body formed by a series of perforated disks or plates, laminated and secured together and having the perforations thereof arranged slightly out of register in such relation as to form a spiral opening through its entire length.

In testimony whereof I have hereunto signed my name to this specification in the presence of the two subscribing witnesses.

JULIAN A. HURDLE.

Witnesses:
MAXWELL HALL ELLIOTT,
WM. C. MORRILL.